US012565456B2

(12) United States Patent (10) Patent No.: US 12,565,456 B2
Isaacson et al. (45) Date of Patent: Mar. 3, 2026

(54) COHERENT DISPERSIBLE GRANULES AND METHODS FOR FORMING COHERENT DISPERSIBLE GRANULES

(71) Applicant: PHOSPHOLUTIONS INC., State College, PA (US)

(72) Inventors: Kyle J. Isaacson, Bradenton, FL (US); Aaron Waltz, Rockford, IL (US); Hunter R. Swisher, St. Petersburg, FL (US)

(73) Assignee: PHOSPHOLUTION INC., State College, PA (US)

( * ) Notice: Subject to any disclaimer, the term of this patent is extended or adjusted under 35 U.S.C. 154(b) by 84 days.

(21) Appl. No.: 18/685,704

(22) PCT Filed: Aug. 24, 2022

(86) PCT No.: PCT/US2022/041364
§ 371 (c)(1),
(2) Date: Feb. 22, 2024

(87) PCT Pub. No.: WO2023/028134
PCT Pub. Date: Mar. 2, 2023

(65) Prior Publication Data
US 2024/0360050 A1 Oct. 31, 2024

Related U.S. Application Data

(60) Provisional application No. 63/236,853, filed on Aug. 25, 2021.

(51) Int. Cl.
*C05B 7/00* (2006.01)
*C05B 1/02* (2006.01)
(Continued)

(52) U.S. Cl.
CPC .................. *C05B 7/00* (2013.01); *C05B 1/02* (2013.01); *C05B 17/00* (2013.01); *C05B 19/02* (2013.01); *C05D 9/00* (2013.01); *C05G 5/12* (2020.02)

(58) Field of Classification Search
CPC .. C05B 7/00; C05B 1/02; C05B 17/00; C05B 19/02; C05G 5/12; C05D 9/00
See application file for complete search history.

(56) References Cited

U.S. PATENT DOCUMENTS 2,976,119 A * 3/1961 Manning ................... C05B 3/00
423/166
3,490,892 A 1/1970 Simpson
(Continued)

FOREIGN PATENT DOCUMENTS

CN 108727002 A 11/2018
CN 110395972 A 11/2019
(Continued)

OTHER PUBLICATIONS

Brattebo et al. "Phorphorous removal by granular activated alumina," Wat. Res., Pergamon Journals Ltd., 1986, p. 977-986, vol. 20 No. 8.
(Continued)

*Primary Examiner* — Wayne A Langel
(74) *Attorney, Agent, or Firm* — McNees Wallace & Nurick LLC

(57) ABSTRACT
Coherent dispersible granules are disclosed including at least one metal oxide domain and at least one phosphate domain, wherein the at least one metal oxide domain and the at least one phosphate domain are present in the coherent dispersible granules as distinct domains coherently agglomerated together and the coherent dispersible granules have a coherent dispersible granule crush strength of at least 5 lbf. Methods for forming the coherent dispersible granules are
(Continued)

disclosed, including co-agglomerating at least one of ammonium phosphate, superphosphate slurry, or nitrophosphate slurry and the metal oxide particles in a rotary drum ammoniator-granulator or granulator to form coherent dispersible granules, and drying the coherent dispersible granules.

21 Claims, 9 Drawing Sheets

(51) Int. Cl.

| | |
|---|---|
| *C05B 17/00* | (2006.01) |
| *C05B 19/02* | (2006.01) |
| *C05D 9/00* | (2006.01) |
| *C05G 5/12* | (2020.01) |

(56) References Cited

U.S. PATENT DOCUMENTS

| | | | | |
|---|---|---|---|---|
| 3,954,942 | A * | 5/1976 | Achorn | C05B 7/00 |
| | | | | 423/313 |
| 4,166,100 | A | 8/1979 | Vorobiev et al. | |
| 4,493,725 | A | 1/1985 | Moon et al. | |
| 4,601,891 | A * | 7/1986 | McGill | C01B 25/405 |
| | | | | 71/34 |
| 5,693,119 | A | 12/1997 | Lynch et al. | |
| 6,287,357 | B1 | 9/2001 | Lynch et al. | |
| 7,485,171 | B2 | 2/2009 | Lynch et al. | |
| 9,919,979 | B2 | 3/2018 | Chen | |
| 10,508,061 | B2 | 12/2019 | Bunderson | |
| 10,513,470 | B2 * | 12/2019 | Clark | C05B 7/00 |
| 11,807,587 | B2 * | 11/2023 | McLaughlin | C05B 17/00 |
| 12,365,637 | B2 * | 7/2025 | Ferguson | C05B 7/00 |
| 2003/0110821 | A1 | 6/2003 | Peacock et al. | |
| 2015/0152017 | A1 | 6/2015 | Schumski et al. | |
| 2021/0114947 | A1 | 4/2021 | Swisher | |
| 2023/0109656 | A1 | 4/2023 | Swisher et al. | |

FOREIGN PATENT DOCUMENTS

| | | | |
|---|---|---|---|
| CN | 112174699 | A | 1/2021 |
| EP | 0367849 | A1 | 5/1990 |
| NZ | 238178 | A | 10/1994 |
| WO | 2001021553 | A1 | 3/2001 |
| WO | 2019191050 | A1 | 10/2019 |

OTHER PUBLICATIONS

Choi et al. "The Removal of Fluoride From Waters by Adsorption," Journal (American Water Works Associations), Oct. 1979, p. 562-570, vol. 71 No. 10.

Coltman et al. "A Sand Culture System for Simulating Plant Responses to Phosphorus in Soil," J. Amer. Soc. Hort. Sci., 1982, p. 938-942, 107(5).

Elliott et al., "A Perspective on Agroecosystem Science," Ecology, Dec. 1989, p. 1597-1602, vol. 70 No. 6.

Hensel, Julius, "Bread From Stones: A New and Rational System of Land Fertilization and Physical Regeneration," Soil and Health Library, Tri-State Press, Long Creek, SC, US, 1894, scan dated Jul. 2009.

Zuyi et al. "On the Applicability of the Langmuir Equation to Estimation of Adsorption Equilibrium Constants on a Powdered Solid from Aqueous Solution," Journal of Colloid and Interface Science, www.idealibrary.com, 2000, p. 8-12, 231.

Belekar et al. "Activated Alumina Granules with nanoscale porosity for water defluoridation," Nano-Structures & Nano-Objects, Elsevier, 2018, p. 322-328, 16.

Roy et al. "Phosphate adsorption on y-alumina: a surface complex model based on surface characterization and zeta potential measurements," Journal of Physical Chemistry C, American Chemical Society, HAL Open Science, 2021, p. 10909-10918, 125(20).

Wan et al. "Polyphosphate Adsorption and Hydrolysis on Aluminum Oxides," Environmental Science & Technology, 2019, p. 9542-9552, 53.

Yue, Checkman Michael "Removal of phosphate by sorption on activated alumina," Masters Theses, Missouri S&T Library and Learning Resources, 1970, 5472.

Coleman et al. "Interactions in Soil: Promoting Plant Growth—Toward a Holistic Approach to Soils and Plant Growth," South China Botanic Garden, Chinese Academy of Sciences, Guangzhou China.

Elliott, E. T. "Division S-3—Soil Microbiology and Biochemistry: Aggregate Structure and Carbon, Nitrogen, and Phosphorous in Native and Cultivated Soils," Soil Sci. Soc. Am. J., 1986, p. 627-633, 50.

PCT Notification of Transmittal of the International Search Report and the Written Opinion of the International Searching Authority, or the Declaration issued to counterpart Application No. PCT/US2022/041364 dated Mar. 17, 2023.

* cited by examiner

Predicted Guaranteed $P_2O_5$ vs. Actual Available $P_2O_5$

Predicted Guaranteed N vs. Actual N

Does $Al_2O_3$ Content Correlate with Reduced Ammonia Usage?

Does $Al_2O_3$ Content Correlate with Granule N Content Reduction?

What Percent of Al$_2$O$_3$ Binding Sites Have Adsorbed Phosphate?

What Percent of Total P$_2$O$_5$ is Water-Soluble, Citrate-Soluble, or Citrate-Insoluble?

COHERENT DISPERSIBLE GRANULES AND METHODS FOR FORMING COHERENT DISPERSIBLE GRANULES

RELATED APPLICATIONS

This application claims the benefit of and priority to U.S. Prov. App. No. 63/236,853, filed Aug. 25, 2021, entitled "Coherent Dispersible Granules and Method for Forming Coherent Dispersible Granules," which is hereby incorporated by reference in its entirety.

FIELD OF THE INVENTION

This application is directed to coherent dispersible granules and methods for forming coherent dispersible granules. In particular, this application is directed to coherent dispersible granules having distinct metal oxide domains and phosphate domains cohered to one another and methods for forming the coherent dispersible granules including incorporating metal oxide-based additives into granulation processes.

BACKGROUND OF THE INVENTION

Phosphorus is a key nutrient for plant growth. Metal oxide-based materials are well-documented to aid in the adsorption and selective, slow-release desorption of orthophosphates in soils, mitigating phosphorus runoff while still providing crops adequate nutrient supply. As presently employed in the field, metal oxide is utilized as a soil amendment that adsorbs phosphorus that is later applied to soils.

Globally, 90% of phosphoric acid produced is utilized in some capacity as a fertilizer (38% diammonium phosphate ("DAP"), 29% monoammonium phosphate ("MAP"), 8% triple superphosphate ("TSP"), 15% other fertilizers such as single superphosphate ("SSP")). In the United States, MAP usage exceeds that of DAP, and its market share is expanding. Nearly all phosphoric acid for fertilizer applications is produced via a multi-step process that involves the mining of phosphate rock, beneficiation, and a concentrated sulfuric acid treatment. Following the production of phosphoric acid of suitable purity, the phosphoric acid may be subjected to a variety of other processing treatments to produce liquid fertilizers, solid fertilizers, animal feed products, and more.

While the production processes differ for each solid fertilizer type (e.g., MAP, DAP, granulated TSP, and granulated SSP), several process similarities exist as well. For example, with phosphate ammoniation-granulation plants (those that produce MAP and DAP), the only significant difference is the input ratio of ammonia to phosphoric acid. Otherwise, all equipment and instrumentation for MAP and DAP production may essentially remain the same in the two processes. While manufacturing processes may also differ between locales, the essential process is largely standardized across the industry. Indeed, a majority of all ammoniation-granulation plants in the U.S. use a specific type of rotary drum mixer that was developed and patented by the Tennessee Valley Authority ("TVA"), either including a pre-neutralization step or a pipe cross reactor. The basic rotary drum ammoniator-granulator is designed with an open-end rotary cylinder which houses the rolling bed of recycled solids.

In the TVA ammoniation-granulation process, phosphoric acid is mixed with about 93 wt % sulfuric acid in an acid surge tank (see FIG. 1). The mixed acids are then fed into a brick-lined acid reactor, where they are partially neutralized with liquid or gaseous anhydrous ammonia. About 70 wt % of all ammonia is introduced into this reactor vessel, producing a slurry of ammonium phosphate and about 22 wt % water that is transported into the rotary drum ammoniator-granulator and distributed along the bed. The remaining about 30 wt % of ammonia is sparged from underneath the slurry. Agglomeration occurs in the rotating drum and is terminated in the dryer. The moist granules then pass through the rotary concurrent dryer before being brought to ambient temperatures in the cooler.

In contrast, for granulated TSP, the majority is produced with the Dorr-Oliver granulation process (see FIG. 3), which involves acid-controlled phosphoric acid and ground phosphate rock being fed into a reactor, with the ground rock and phosphoric acid slurry being fed into a granulator and subsequently dried in a generally continuous fashion. Granulated SSP follows a similar process; however, the ground phosphate rock is reacted with sulfuric acid in lieu of phosphoric acid.

To improve upon phosphorus adsorption efficiency to metal oxide, a complex agglomerated dispersible granule has been designed, where fine metal oxide particles as well as fine MAP, DAP, granulated TSP, and/or granulated SSP are agglomerated into a single granule. This process requires initial processing of the metal oxide, initial processing of the MAP, DAP, granulated TSP, and/or granulated SSP, and subsequent agglomeration/co-granulation of all components. This agglomeration process also limits the size and crush strength of the granules produced.

Dispersible granules and process for producing dispersible granules not suffering from the above-described limitations would be desirable.

BRIEF DESCRIPTION OF THE INVENTION

In one exemplary embodiment, coherent dispersible granules include at least one metal oxide domain and at least one phosphate domain, wherein the at least one metal oxide domain and the at least one phosphate domain are present in the coherent dispersible granules as distinct domains coherently agglomerated together and the coherent dispersible granules have a coherent dispersible granule crush strength of at least 5 lbf.

In another exemplary embodiment, a method for forming coherent dispersible granules includes disposing phosphoric acid and, optionally, sulfuric acid in an acid surge tank, reacting the phosphoric acid and, optionally, the sulfuric acid with ammonia in a reactor vessel to form ammonium phosphate, introducing metal oxide particles into the presence of the ammonium phosphate, co-agglomerating the ammonium phosphate and the metal oxide particles in a rotary drum ammoniator-granulator to form coherent dispersible granules, and drying the coherent dispersible granules. The coherent dispersible granules include at least one metal oxide domain and at least one phosphate domain which are present in the coherent dispersible granules as distinct domains and the coherent dispersible granules have a coherent dispersible granule crush strength of at least 5 lbf.

In another exemplary embodiment, a method for forming coherent dispersible granules includes mixing ground phosphate rock and at least one of phosphoric acid, sulfuric acid, or nitric acid in a reactor, reacting the ground phosphate rock with the at least one of the phosphoric acid, the sulfuric acid, or the nitric acid, in the reactor to form at least one of a superphosphate slurry or a nitrophosphate slurry, introducing metal oxide particles into the presence of the at least one of the superphosphate slurry or the nitrophosphate slurry, co-agglomerating the at least one of the superphosphate slurry or the nitrophosphate slurry and the metal oxide particles in a rotary drum granulator to form coherent dispersible granules, and drying the coherent dispersible granules. The coherent dispersible granules include at least one metal oxide domain and at least one superphosphate or nitrophosphate domain which are present in the coherent dispersible granules as distinct domains and the coherent dispersible granules have a coherent dispersible granule crush strength of at least 5 lbf.

In another exemplary embodiment, a method for forming coherent dispersible granules includes melting at least one acidic phosphate from a solid form to a liquid form, introducing metal oxide particles into the presence of the at least one acidic phosphate, co-agglomerating the at least one acidic phosphate and the metal oxide particles in a rotary drum granulator to form coherent dispersible granules, and drying the coherent dispersible granules. The coherent dispersible granules include at least one metal oxide domain and at least one phosphate domain which are present in the coherent dispersible granules as distinct domains and the coherent dispersible granule crush strength of at least 5 lbf.

BRIEF DESCRIPTION OF THE DRAWINGS

These and other features, aspects, and advantages of the present subject matter will become better understood when the following detailed description is read with reference to the accompanying drawings in which.

4

Figure 12:
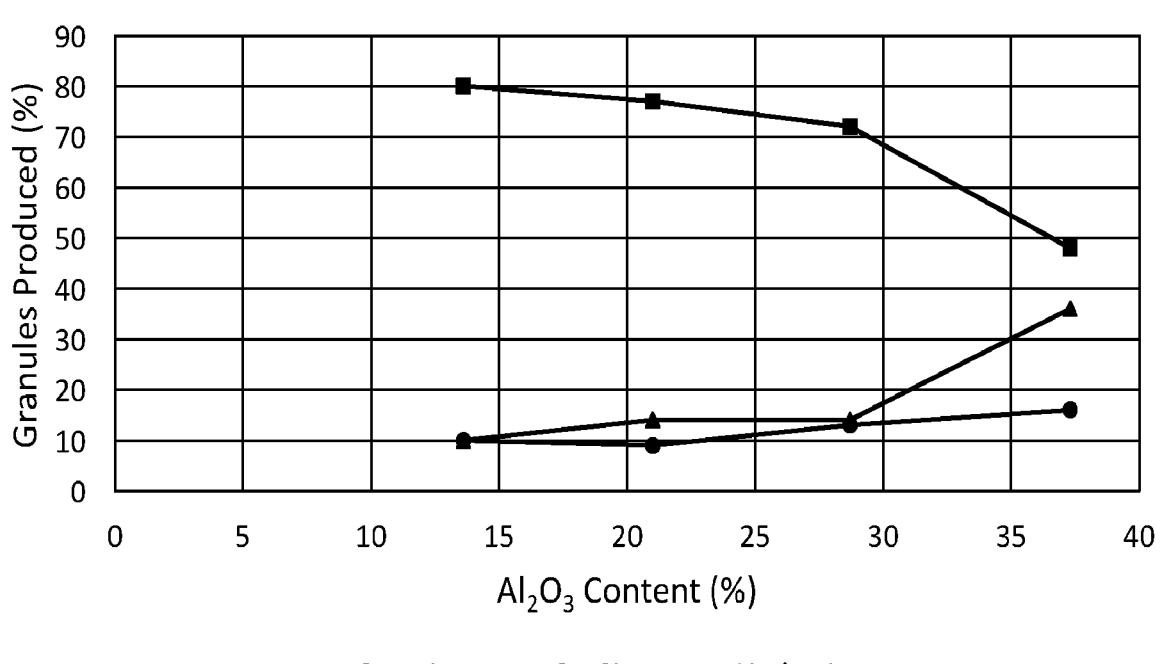

FIG. 12 is a plot correlating granules produced with alumina content in coherent dispersible granule production, according to an embodiment of the present disclosure.

Figure 13:
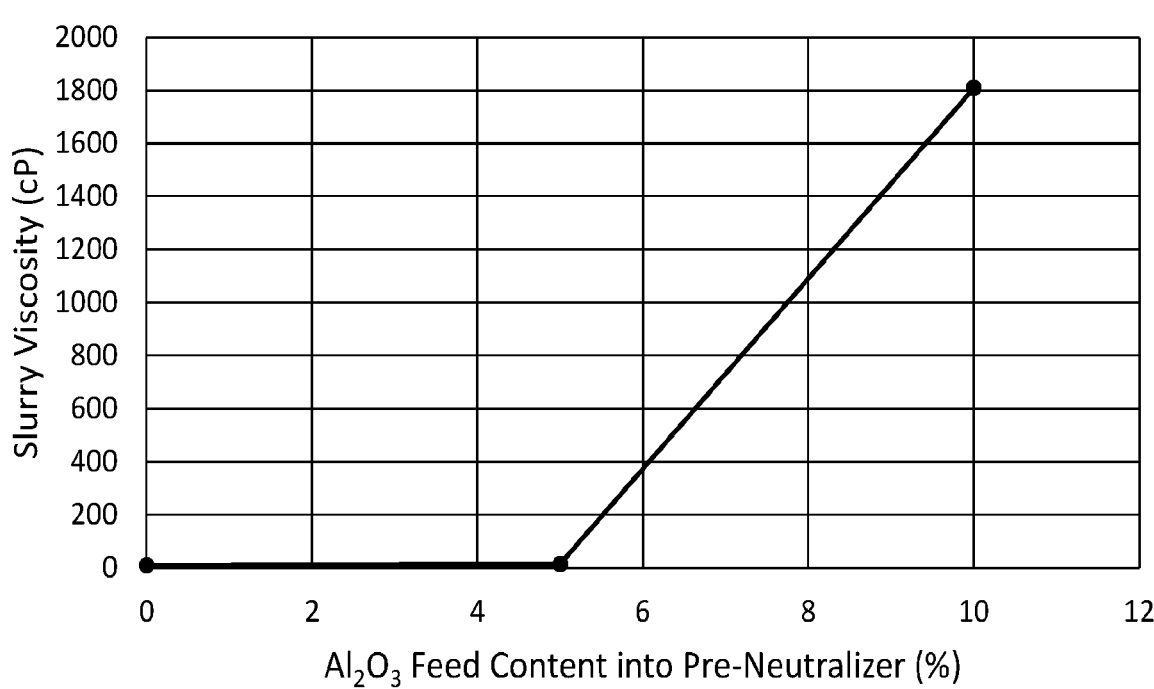

FIG. 13 is a plot correlating slurry viscosity with alumina content in coherent dispersible granule formation, according to an embodiment of the present disclosure.

Wherever possible, the same reference numbers will be used throughout the drawings to represent the same features.

DETAILED DESCRIPTION OF THE INVENTION

Disclosed herein are coherent dispersible granules 1 and methods for forming coherent dispersible granules 1 having metal oxide particles and phosphate particles present as distinct domains. By incorporating metal oxide particles directly into a MAP, DAP, granulated SSP, granulated TSP, and/or nitrophosphate production process, the creation of a complex granule is achieved while decreasing the number of distinct manufacturing steps. Embodiments of the present disclosure, in contrast to granules and methods lacking one or more of the features disclosure herein, have greater production efficiency, greater coherent dispersible granule crush strength, less intergranular variability in metal oxide: phosphate weight ratio, improved interaction between metal oxide and phosphorus domains, improved metal oxide surface area and activity, reduced moisture content, greater hygroscopic stability, or combinations thereof. The metal oxide particles may serve as nucleation sites for coherent granule formation, leading to improved surface contact between phosphate domains 3 and metal oxide domains 2 and decreased variability in metal oxide:phosphate ratio between individual granules. Less binder may be used, increasing proportions of metal oxide and phosphorus within a single granule. Granule moisture content may decrease, and the granule may exhibit greater hygroscopic stability.

As used herein, "about" indicates a variance of up to 10% from the value being so modified. All values modified with "about" are also intended to convey the unmodified value as an alternative, so that "about 10 μm," by way of examples, discloses both a range of 9-11 μm as well as specifically 10 μm.

As used herein, "coherent" dispersible granules are differentiated from "agglomerated" dispersible granules in that "agglomerated" refers to granules formed by mechanically agglomerating at least two types of preformed particles together, whereas "coherent" refers to granules formed by agglomerating one type of preformed particle with a second domain of material which is being simultaneously formed. Structural distinctions between coherent dispersible granules 1 and agglomerated dispersible granules include, but are not limited to, greater granule crush strength, improved resistance to attrition, reduced moisture content, greater hygroscopic stability, less intergranular variability in metal oxide:phosphate weight ratio, greater contact surface area between metal oxide domains 2 and phosphate domains 3 resulting in tighter adhesion, increased metal oxide surface area, reduced binder incorporation, a greater degree of intermixed domains, or combinations thereof.

In one embodiment, methods for forming coherent dispersible granules 1 include ammoniation-granulation processes with phosphoric acid and, optionally, sulfuric acid, granulation processes with phosphoric acid and, optionally, sulfuric acid, or other granulation processes with liquid acidic phosphate melted from a solid state.

Figure 1:
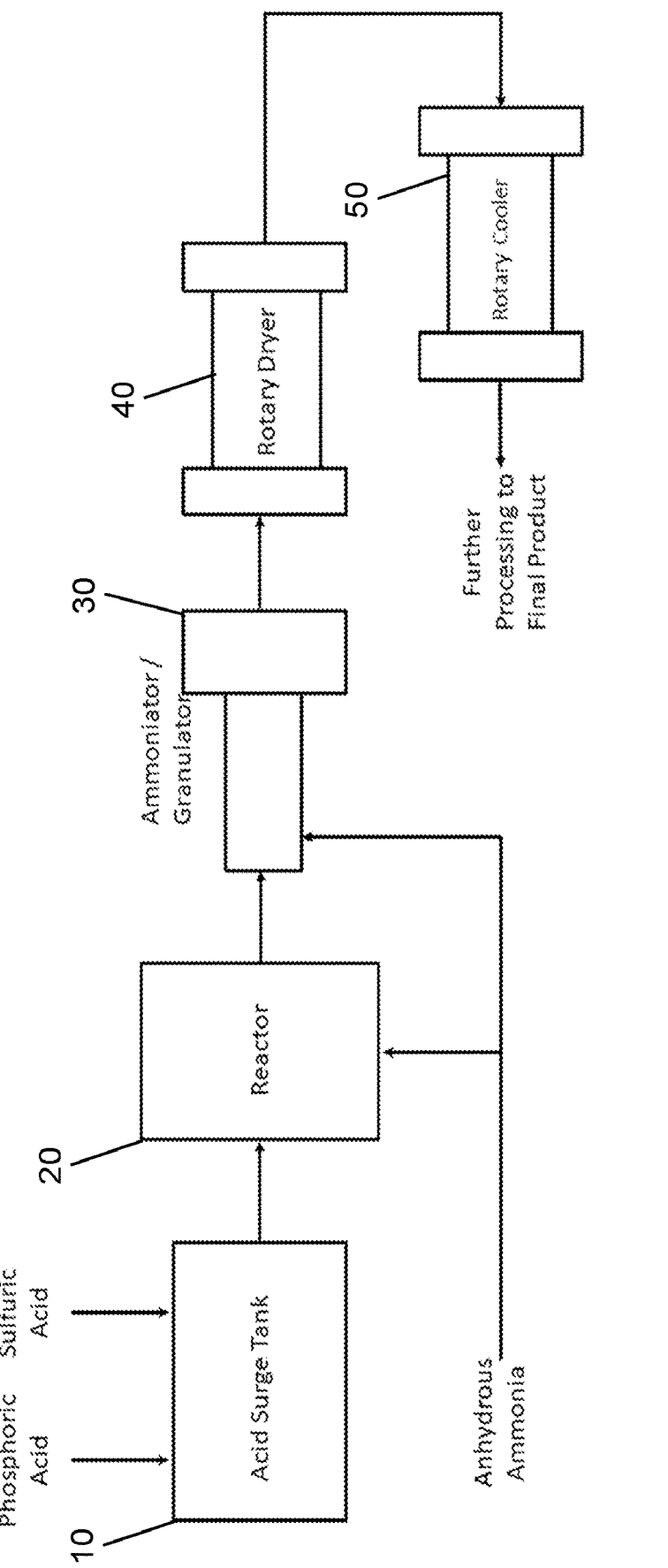
FIG. 1 is a production schematic for MAP and DAP from phosphoric acid when using a pre-neutralization step, as known and presently used.
Figure 2:
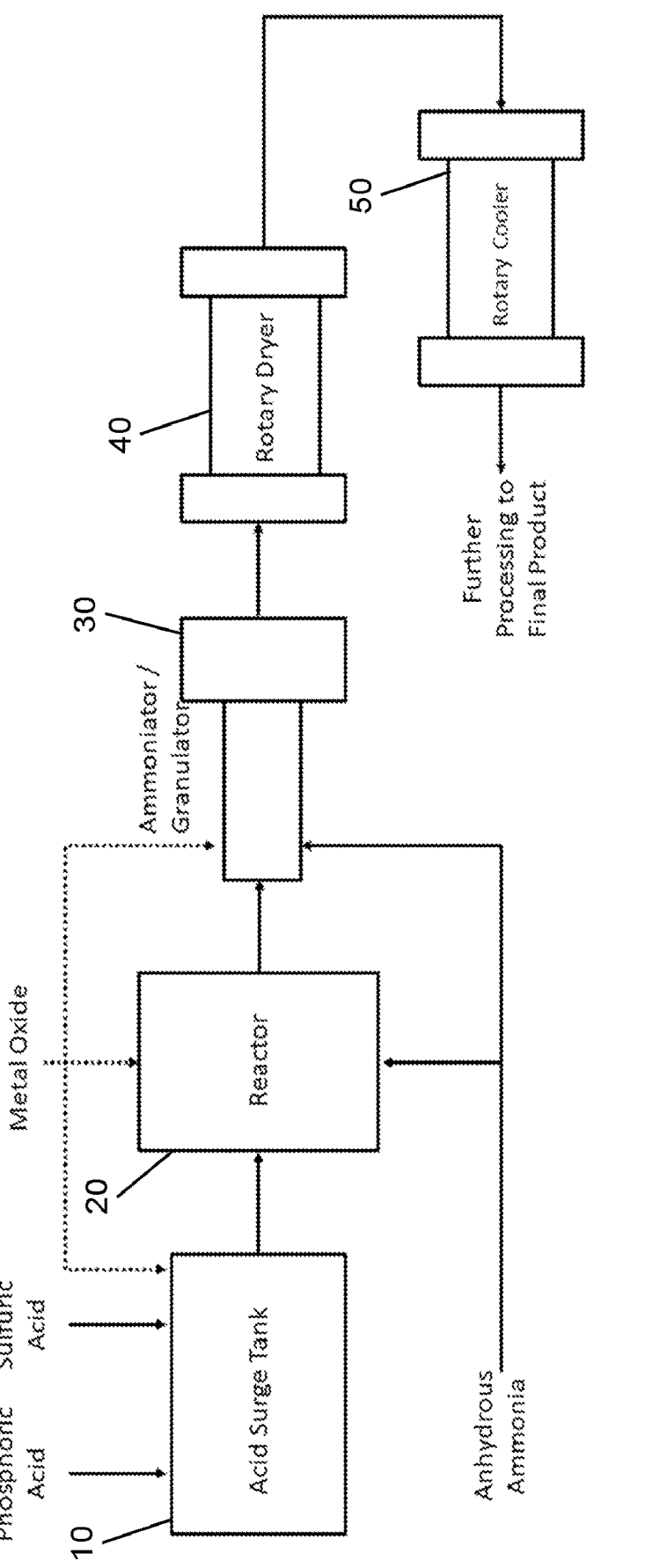
FIG. 2 is a production schematic for coherent dispersible granules, according to an embodiment of the present disclosure.
Figure 3:
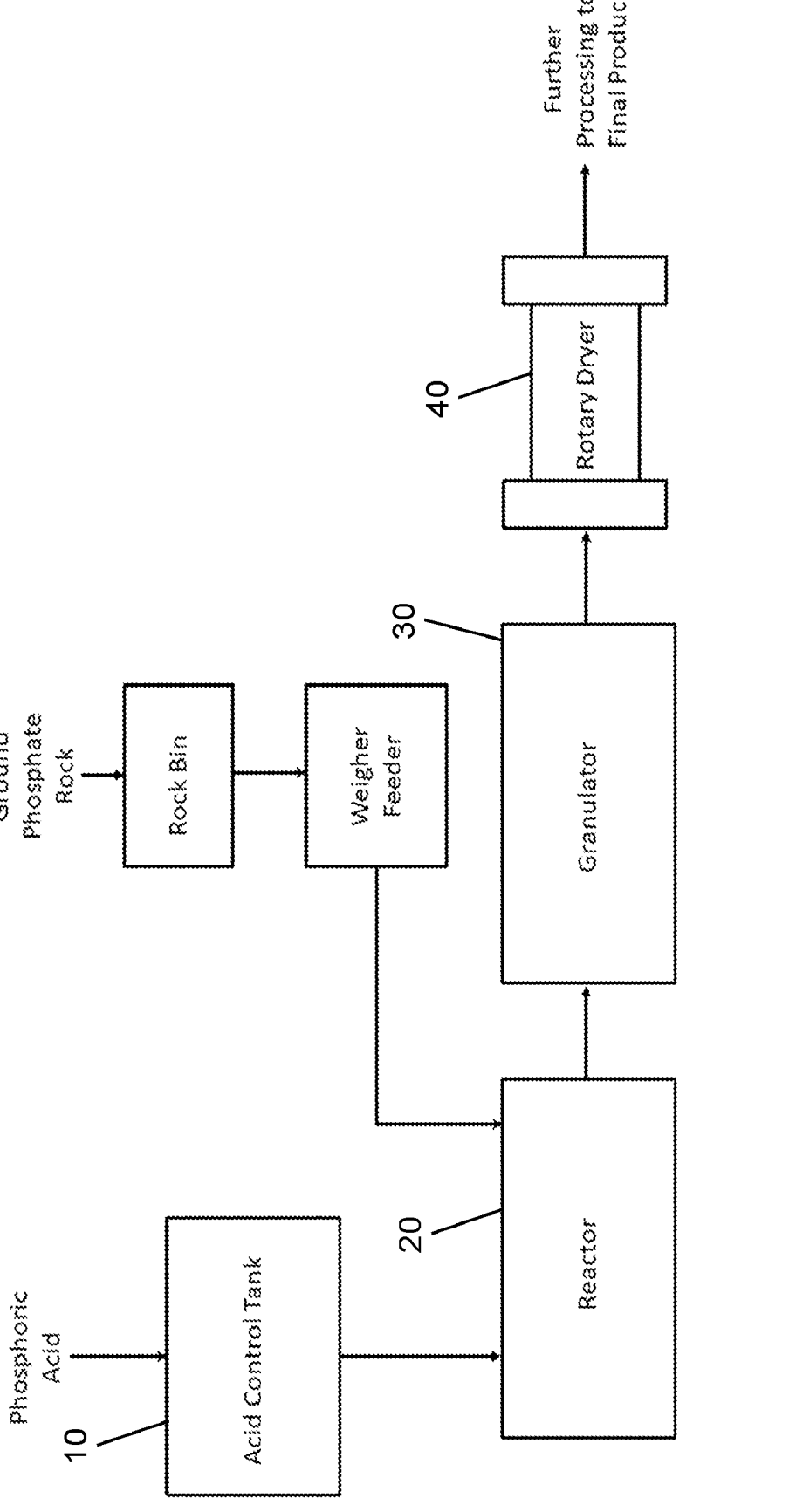
FIG. 3 is a production schematic for granulated TSP and granulated SSP from at least one of phosphoric acid or sulfuric acid and phosphate rock, as known and presently used. A production schematic for nitrophosphate would be identical other than replacing sulfuric acid or phosphoric acid with nitric acid.

Referring to FIG. 2, in one embodiment, a method for forming coherent dispersible granules 1 includes disposing phosphoric acid and, optionally, sulfuric acid in an acid surge tank 10, reacting the phosphoric acid and, optionally, the sulfuric acid with ammonia in a reactor vessel 20 to form ammonium phosphate, introducing metal oxide particles into the presence of the ammonium phosphate, co-agglomerating the ammonium phosphate and the metal oxide particles in a rotary drum ammoniator-granulator 30 to form coherent dispersible granules 1, and drying the coherent dispersible granules 1, wherein the at least one metal oxide domain 2 and the at least one phosphate domain 3 are present in the coherent dispersible granules 1 as distinct domains coherently agglomerated together.

Figure 4:
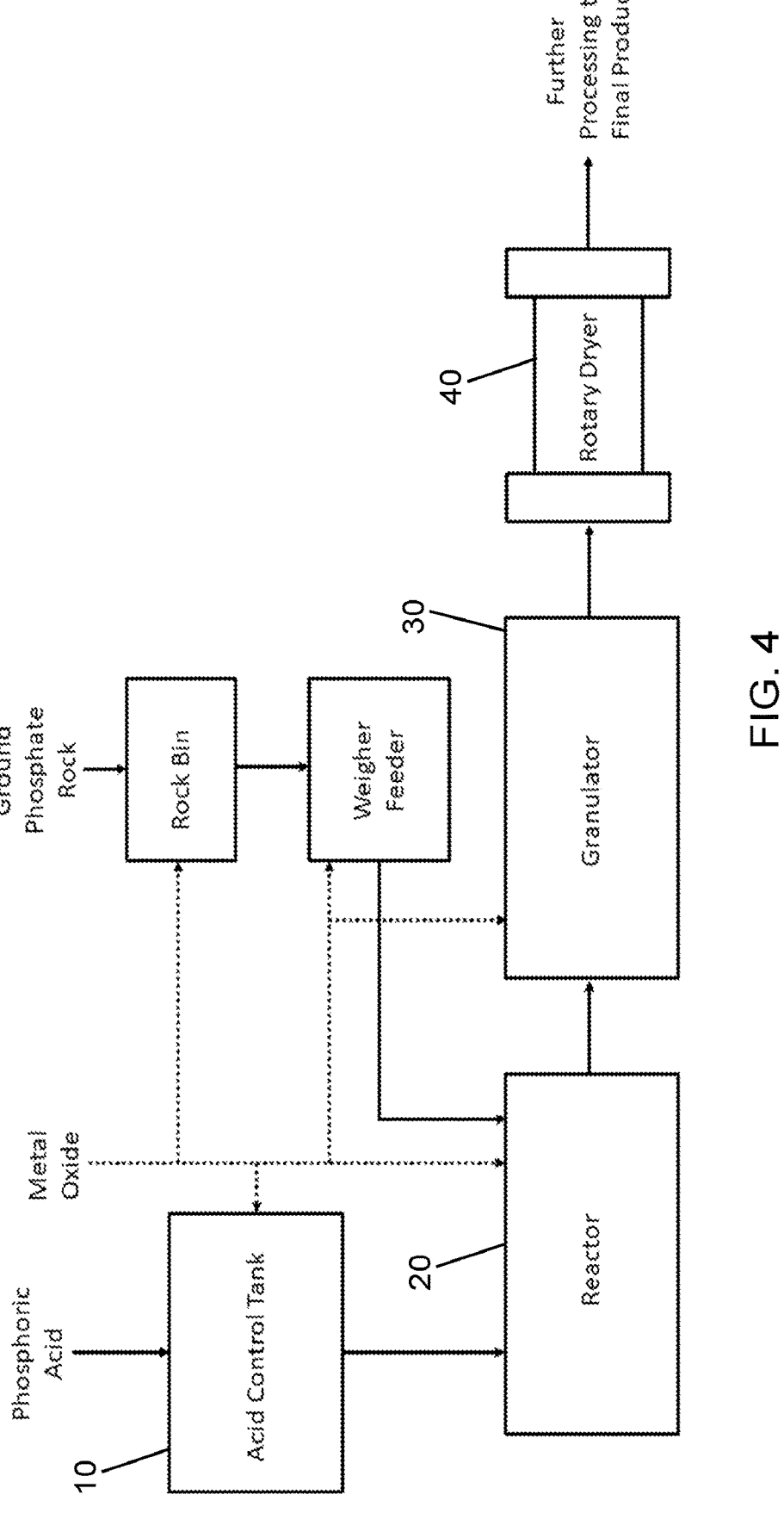
FIG. 4 is a production schematic for coherent dispersible granules, according to an embodiment of the present disclosure.

Referring to FIG. 4, in one embodiment, a method for forming coherent dispersible granules 1 includes mixing at least one of phosphoric acid, sulfuric acid, or nitric acid and ground phosphate rock in a reactor 20, feeding the slurry into a granulator 30, introducing metal oxide particles into the presence of the agglomerating superphosphate or nitrophosphate, co-agglomerating the superphosphate or nitrophosphate and the metal oxide particles in the granulator 30 to form the coherent dispersible granules 1, and drying the coherent dispersible granules 1, wherein the at least one metal oxide domain 2 and the at least one phosphate domain 3 are present in the coherent dispersible granules 1 as distinct domains coherently agglomerated together.

In one embodiment, a method for forming coherent dispersible granules 1 includes melting at least one acidic phosphate from a solid form to a liquid form, introducing metal oxide particles into the presence of the at least one acidic phosphate, co-agglomerating the at least one acidic phosphate and the metal oxide particles in a rotary drum granulator 30 to form coherent dispersible granules 1 and drying the coherent dispersible granules 1. The coherent dispersible granules 1 include at least one metal oxide domain 2 and at least one phosphate domain 3 which are present in the coherent dispersible granules 1 as distinct domains and the coherent dispersible granules 1 have a coherent dispersible granule crush strength of at least 5 lbf. The at least one acidic phosphate may be, but is not limited to, a monoammonium phosphate, a diammonium phosphate, or combinations thereof. Melting the at least one acidic phosphate and co-agglomerating the at least one acidic phosphate and the metal oxide particles may include any suitable process, including, but not limited to, a steam granulation process.

The metal oxide of the at least one metal oxide domain 2 and the metal oxide particles may be any suitable metal oxide, including, but not limited to, aluminum oxide, $\alpha$-alumina, $\beta$-alumina, $\gamma$-alumina, $\delta$-alumina, bauxite, bauxite residue (also referred to as red mud, red sludge, bauxite tailings, or alumina refinery residues), alum sludge, alumina trihydrate, alumina monohydrate, bochmite, pseudobochmite, gibbsite, iron oxide, hematite, maghemite, magnetite, goethite, iron hydroxide, calcium oxide, calcium hydroxide, copper oxide, magnesium oxide, manganese oxide, manganese dioxide, nickel oxide, silicon dioxide, and zinc oxide, or combinations thereof. As used herein, "metal oxide" is understood to be inclusive of metal oxide hydrates and metal oxide hydroxides.

Introducing the metal oxide particles into the presence of the ammonium phosphate may include premixing the metal oxide particles with the phosphoric acid prior to reacting the phosphoric acid with the ammonia, adding the metal oxide particles into the acid surge tank 10, adding the metal oxide particles into the reactor vessel 20, adding the metal oxide particles into the rotary drum ammoniator-granulator 30, or any combination thereof. In one embodiment, the metal oxide particles are maintained within a pH range of about 1.5 to about 7.5 from introduction through coherent agglomeration, alternatively about 1.5 to 2.5, alternatively about 2 to 3, alternatively about 2.5 to 3.5, alternatively about 3 to 4, alternatively about 3.5 to 4.5, alternatively about 4 to 5, alternatively about 4.5 to 5.5, alternatively about 5 to 6, alternatively about 5.5 to 6.5, alternatively about 6 to 7, alternatively about 6.5 to 7.5, or any sub-range or combination thereof.

In one embodiment, the reactor vessel 20 is a pipe cross reactor. Introducing the metal oxide particles into the presence of the ammonium phosphate may include feeding the metal oxide through the pipe cross reactor.

Drying the coherent dispersible granules 1 may include drying the coherent dispersible granules 1 in a rotary dryer 40. Further metal oxide particles may be introduced into the rotary dryer 40 to be dried and further agglomerated with the coherent dispersible granules 1.

The coherent dispersible granules 1 may have a greater coherent dispersible granule crush strength than comparative agglomerated dispersible granules formed by agglomerating the metal oxide particles with preformed phosphate particles. In one embodiment, the coherent dispersible granules 1 have a coherent dispersible granule crush strength of at least 5 lbf, alternatively at least 5.5 lbf, alternatively at least 6 lbf, alternatively at least 6.5 lbf, alternatively at least 7 lbf, alternatively at least 7.5 lbf, alternatively at least 8 lbf, alternatively at least 8.5 lbf, alternatively at least 9 lbf, alternatively at least 9.5 lbf, alternatively at least 10 lbf.

The coherent dispersible granules 1 may have reduced intergranular metal oxide:phosphate weight ratio variability than comparative agglomerated dispersible granules formed by agglomerating the metal oxide particles with preformed phosphate particles, alternatively 5% less intergranular metal oxide:phosphate weight ratio variability, alternatively 10% less, alternatively 15% less, alternatively 20% less, alternatively 25% less. In one embodiment, the coherent dispersible granules 1 have an intergranular variability in metal oxide:phosphate weight ratio of ±40%, alternatively ±35%, alternatively ±30%, alternatively ±25%, alternatively ±20%, alternatively ±15%. As used herein, intergranular variability is measured relative to the lesser component of metal oxide and phosphate as measured by the average across the coherent dispersible granules 1 such that if the average metal oxide:phosphate weight ratio is 50:50 with an intergranularity of ±40%, the metal oxide:phosphate weight ratio may range from 30:70 to 70:30. By way of further explanation, if the average metal oxide:phosphate weight ratio is 25:75 with an intergranularity of ±40%, the metal oxide:phosphate weight ratio may range from 15:85 to 35:65.

Structural distinctions between "coherent dispersible granules" and "agglomerated dispersible granules" include, but are not limited to, greater granule crush strength, improved resistance to attrition, reduced moisture content, greater hygroscopic stability, less intergranular variability in metal oxide:phosphate weight ratio, greater contact surface area between metal oxide and phosphate domains 3, tighter adhesion between metal oxide and phosphate domains 3, increased metal oxide surface area, reduced binder incorporation, a greater degree of intermixed domains, or combinations thereof.

Figure 5:
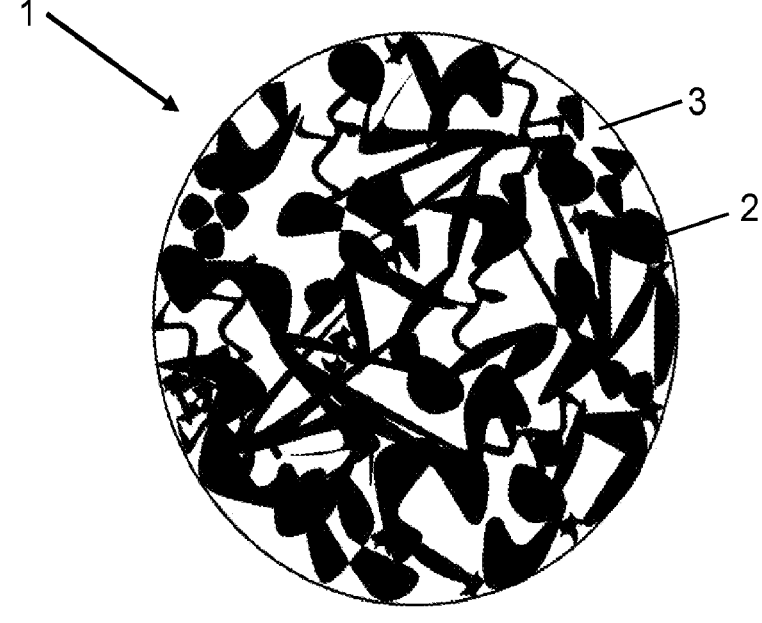
FIG. 5 is a cross-sectional schematic view of a coherent dispersible granule, according to an embodiment of the present disclosure.

Referring to FIG. 5, in one embodiment, the coherent dispersible granules 1 include at least one metal oxide domain 2, and at least one phosphate domain 3, wherein the at least one metal oxide domain 2 and the at least one phosphate domain 3 are present in the coherent dispersible granules 1 as distinct domains coherently agglomerated together. The at least one metal oxide domain 2 may include, but is not limited to, an activated metal oxide domain 2, such as, but not limited to, activated aluminum oxide. The at least one phosphate domain 3 may include, but is not limited to, MAP, DAP, granulated TSP, granulated SSP, or combinations thereof.

The at least one metal oxide domain 2 and the at least one phosphate domain 3 may be intragranularly homogenously or heterogeneously distributed in the coherent dispersible granules 1. The at least one metal oxide domain 2 and the at least one phosphate domain 3 may be intergranularly homogenously or heterogeneously distributed in the coherent dispersible granules 1.

In one embodiment, each of the at least one metal oxide domain 2 is at least 50% surrounded by the at least one phosphate, alternatively at least 60% surrounded, alternatively at least 70% surrounded, alternatively at least 80% surrounded, alternatively at least 90% surrounded, alternatively at least 95% surrounded, alternatively at least 99% surrounded, alternatively entirely surrounded.

The coherent dispersible granules 1 may have any suitable weight ratio of metal oxide to phosphate, including, but not limited to, a weight ratio of 10:1 to 1:10, alternatively 8:1 to 1:8, alternatively 7:1 to 1:7, alternatively 6:1 to 1:6, alternatively 5:1 to 1:5, alternatively 4:1 to 1:4, alternatively 3:1 to 1:3, alternatively 2:1 to 1:2, alternatively 3:1 to 1:1, alternatively 1:1 to 1:3, alternative about 2:1, alternatively about 1:1, alternatively about 1:2, or any sub-range or combination of ranges thereof.

The coherent dispersible granules 1 may further include at least one of a water-soluble binder, a suspension agent, or an emulsifying agent. In one embodiment, the coherent dispersible granules 1 include, by weight, 1-40% water-soluble binder, alternatively 5-35%, alternatively 5-15%, alternatively 10-20%, alternatively 15-25%, alternatively 20-30%, alternatively 25-35%, or any sub-range or combination thereof. Suitable water-soluble binders include, but are not limited to, calcium lignosulfonate, ammonium lignosulfonate, or combinations thereof. Suitable suspension agents include, but are not limited to, polysaccharides, inorganic salts, carbomers, or combinations thereof. Suitable emulsifying agents include, but are not limited to, vegetable derivatives such as acacia, tragacanth, agar, pectin, carrageenan, or lecithin, animal derivatives such as gelatin, lanolin, or cholesterol, semi-synthetic agents such as methylcellulose, or carboxymethylcellulose, synthetics such as benzalkonium chloride, benzethonium chloride, alkali soaps (including sodium or potassium oleate), amine soaps (including triethanolamine stearate), detergents (including sodium lauryl sulfate, sodium dioctyl sulfosuccinate, or sodium docusate), sorbitan esters, polyoxyethylene derivatives of sorbitan esters, glyceryl esters, or combinations thereof. In another embodiment, the coherent dispersible granules 1 are free of water-soluble binders, suspension agents, emulsifying agents, any two of the foregoing, are all of the foregoing.

The coherent dispersible granules 1 may further include at least one additional domain present as a distinct domain. Suitable additional domains include, but are not limited to, at least one nutrient domain, at least one pesticide domain, at least one biological additive domain, or combinations thereof. The at least one additional domain may be coherently agglomerated with the at least one metal oxide domain 2 and the at least one phosphate domain 3 in the coherent dispersible granules 1, the at least one additional domain may be agglomerated with the coherently agglomerated at least one metal oxide domain 2 and at least one phosphate domain 3, the at least one additional domain may be coated onto the coherently agglomerated at least one metal oxide domain 2 and at least one phosphate domain 3, the at least one additional domain may be intermixed with the coherent dispersible granules 1, or combinations thereof. By way of non-limiting example, in one embodiment, a coherent dispersible granule I could include at least one nutrient domain coherently agglomerated with the at least one metal oxide domain 2 and the at least one phosphate domain 3, at least one pesticide domain agglomerated with the coherently agglomerated at least one nutrient domain, at least one metal oxide domain 2, and at least one phosphate domain 3, and at least biological additive domain coated onto the at least one pesticide domain agglomerated with the coherently agglomerated at least one nutrient domain, at least one metal oxide domain 2, and at least one phosphate domain 3.

Suitable at least one nutrient domains include, but are not limited to, at least one additive selected from the group consisting of bioavailable species of molybdenum, selenium, zinc, copper, cobalt, iron, nickel, manganese, vanadium, calcium, potassium, sulfur, chlorine, silicon, magnesium, sodium, nitrogen, boron, and combinations thereof. Bioavailable species of the foregoing nutrients include, but are not limited to, $MoO_2$, $SeO_2$, $Zn^{2+}$, $ZnCl$, $CuCO_3$, $Co^{2+}$, $Fe^{2+}$, $Fe^{3+}$, $Ni^{2+}$, $NiCl^+$, $Mn^{2+}$, $MnCl^+$, $HVO_4^{2-}$, $Ca^{2+}$, $K^+$, $SO_4^{2-}$, $Cl^-$, $SiOH_4$, $Mg^{2+}$, $Na^+$, $NH^{4+}$, $NO_3^-$, $H_3BO_3$, and $B_4O_7^{2-}$.

Suitable at least one pesticide domains include, but are not limited to, herbicides, insecticides, fungicides, nematicides, or combinations thereof. Suitable herbicides include, but are not limited to, sulfonylureas, HPPD-inhibitors, chloroacetamides, PPO-inhibitors, phenylurea, triazines, or combinations thereof. Suitable insecticides include, but are not limited to, organophosphates, carbamides, pyrethrins, neonicotinoids, spinosins, indoxacarb, diamides, or combinations thereof. Suitable fungicides include, but are not limited to, strobilurines, pyrimidines, triazoles, dicarboximides, or combinations thereof. Suitable nematicides include, but are not limited to, avermectin, carbamates, organophosphates, or combinations thereof.

Suitable at least one biological additive domains include, but are not limited to, at least one additive selected from the group consisting of humics, fulvics, living microbes, microbial metabolites, plant extracts, exogenous plant hormones, and combinations thereof. Any suitable variations of humic or fulvic acid-containing formulations or any materials of which are organic matter derived and contain numerous humic and/or fulvic acid species may be employed. Microbes may include, but are not limited to, *Rhodopseudomonas* spp., *Bacillus* spp., *Pseudomonas* spp., *Saccharomyces* spp., *Aspergillus* spp., *Candida* spp., *Streptococcus* spp., *Lactobacillus* spp., or combinations thereof. Plant extracts may include, but are not limited to, phytohormones, quinols, plastoquinones, flavonoids, plant-growthpromoting metabolites, or combinations thereof. Exogenous plant hormones may include, but are not limited to, IDAA, gibberellin, abscisic acid, auxins, jasmonates, brassinosteroids, cytokinins, salicylic acid, or combinations thereof.

The metal oxide particles constituting the metal oxide domain 2 may have any suitable size. In one embodiment, to maintain adsorptive capacity for phosphate and optimizing the metal oxide particle size for penetrating the soil profile through a surface application, a preferred particle size for metal oxide particles is smaller than about 300 μm, alternatively smaller than about 150 μm, alternatively smaller than about 100 μm, alternatively smaller than about 75 μm, alternatively smaller than about 50 μm, alternatively smaller than about 25 μm, or smaller, or any sub-range or combination thereof.

The coherent dispersible granules 1 may further include mineral particles. The mineral particles may be coherently agglomerated in the coherent dispersible granules 1, agglomerated with the coherent dispersible granules 1, or intermixed with the coherent dispersible granules 1.

In one embodiment, the coherent dispersible granules 1 include by weight, 5-80% metal oxide domain 2, 10-95% phosphate domain 3, and, optionally, 1-50% water-soluble binder, alternatively 30-40% metal oxide domain 2, 30-40% phosphate domain 3, and 20-40% water-soluble binder, alternatively 35% metal oxide domain 2, 35% phosphate domain 3, and 30% water-soluble binder. In a further embodiment, the coherent dispersible granules 1 include by weight, 5-70% metal oxide domain 2, 10-70% phosphate domain 3, up to 50% water-soluble binder, and up to 20% surfactants and emulsifiers combined, alternatively consist of, by weight, 5-50% metal oxide domain 2, 10-50% phosphate domain 3, up to 50% water-soluble binder, and up to 5% surfactants and emulsifiers combined.

The coherent dispersible granules 1 may have any suitable size (as measured by diameter based upon the median within the sample). Suitable sizing for the coherent dispersible granules 1 may include, but is not limited to, about 0.4 mm to about 4.0 mm, alternatively about 0.4 mm to about 1.2 mm, alternatively about 0.9 mm to about 1.5 mm, alternatively about 1.2 mm to about 1.8 mm, alternatively about 1.5 mm to about 2.1 mm, alternatively about 1.8 mm to about 2.4 mm, alternatively about 2.1 mm to about 2.7 mm, alternatively about 2.4 mm to about 3.0 mm, alternatively about 2.7 mm to about 3.3 mm, alternatively about 3.0 mm to about 3.6 mm, alternatively about 3.3 mm to about 4.0 mm, alternatively about 0.4 mm, alternatively about 0.5 mm, alternatively about 0.6 mm, alternatively about 0.7 mm, alternatively about 0.8 mm, alternatively about 0.9 mm, alternatively about 1.0 mm, alternatively about 1.1 mm, alternatively about 1.2 mm, alternatively about 1.3 mm, alternatively about 1.4 mm, alternatively about 1.5 mm, alternatively about 1.6 mm, alternatively about 1.7 mm, alternatively about 1.8 mm, alternatively about 1.9 mm, alternatively about 2.0 mm, alternatively about 2.1 mm, alternatively about 2.2 mm, alternatively about 2.3 mm, alternatively about 2.4 mm, alternatively about 2.5 mm, alternatively about 2.6 mm, alternatively about 2.7 mm, alternatively about 2.8 mm, alternatively about 2.9 mm, alternatively about 3.0 mm, alternatively about 3.1 mm, alternatively about 3.2 mm, alternatively about 3.3 mm, alternatively about 3.4 mm, alternatively about 3.5 mm, alternatively about 3.6 mm, alternatively about 3.7 mm, alternatively about 3.8 mm, alternatively about 3.9 mm, alternatively about 4.0 mm, alternatively more than about 4.0 mm, or any sub-range or combination thereof. In one non-limiting example, golf greens may use coherent dispersible granules 1 of about 0.5 mm to about 0.8 mm. In another non-limiting example, corn may use coherent dispersible granules 1 via a broadcast application of about 2.4 mm. In a third non-limiting example, any crop with a strip-till machine application may use coherent dispersible granules 1 of about 1.5 mm. In one embodiment, suitable, for example, for application as a suspension, the coherent dispersible granules 1 are micronized, and have a particle size less than about 200 μm, alternatively less than about 150 μm, alternatively less than about 100 μm, alternatively less than about 75 μm, alternatively less than about 1 μm, alternatively less than about 1 μm, alternatively less than about 50 μm, alternatively less than about 25 μm, alternatively less than about 10 μm, alternatively less than about 5 μm, alternatively less than about 2 μm, alternatively less than about 1 μm, alternatively less than about 0.75 μm, alternatively less than about 0.5 μm, alternatively less than about 0.25 μm, alternatively less than about 0.1 μm, alternatively less than about 0.05 μm, alternatively less than about 0.01 μm, as measured by largest particle dimension.

EXAMPLES

Examples were prepared via a standard granulated mono-ammonium phosphate production method in which phosphoric acid was disposed in an acid surge tank 10 and then reacted with ammonia in a reactor vessel 20 to form mono-ammonium phosphate. The process was performed in certain trials using a pre-neutralizer setup and in other trials using a pipe-cross reactor. All material feeds were monitored and used to calculate feed material ratios. Aluminum oxide was mixed with the recycle feeds and fed into the granulator 30 at desired ratios, except for in two trials where the aluminum oxide was directly fed into the pre-neutralizer vessel and was granulated as part of the slurry feed into the granulator 30.

Viscosity was determined using Brookfield Ametek Dial Reading Viscometer, Model LVT.

All product samples collected at the end of each testing period were analyzed for total nitrogen, total $P_2O_5$, water-soluble $P_2O_5$, citrate-soluble $P_2O_5$, aluminum oxide ($Al_2O_3$), total sulfur, and moisture content. All chemical analyses were performed according to the AOAC International methods, except for total nitrogen which was determined using a combustion analyzer. Moisture content was determined using the vacuum desiccator method.

Coherent dispersible granules 1 were characterized by size analysis, crush strength, abrasion resistance, and impact resistance, as summarized in Table 1. Granule size analysis was performed using the sieve method outlined in Procedure IFDC S-107-1 in the *Manual for Determining Physical Properties of Fertilizer* (IFDC R-10). This method determined Size Guide Number (SGN) and Uniformity Index (U.I.). Granule crush strength was determined using a force sensor following the Procedure IFDC S-115 in the *Manual for Determining Physical Properties of Fertilizer* (IFDC R-10). Abrasion resistance was determined by rolling granules alongside steel balls as outlined in the Procedure IFDC S-116 in the *Manual for Determining Physical Properties of Fertilizer* (IFDC R-10). Impact resistance was determined by impacting the granules within a bagged system as outlined in the Procedure IFDC S-118 in the *Manual for Determining Physical Properties of Fertilizer* (IFDC R-10).

TABLE 1

Granule characteristics.

| Trial | Al$_2$O$_3$ Content (measured) | Crush Strength (lbf) (2.38-2.80 mm granules) | Crush Strength (lbf) (2.80-3.35 mm granules) | Size Guide Number (SGN) | Uniformity Index | Abrasion Resistance (% Degradation) | Impact Resistance (% Shattered Granules) |
|---|---|---|---|---|---|---|---|
| Inventive | | | | | | | |
| 20.63% Al$_2$O$_3$ Feed (Pre-Neutralizer Setup) | 13.7% | 9.0 | 13.0 | 333 | 64 | 0.25% | 1.92% |
| 20.63% Al$_2$O$_3$ Feed (Pipe-cross reactor setup) | 13.6% | 9.3 | 12.3 | 346 | 57 | 0.47% | 1.88% |
| 30% Al$_2$O$_3$ Feed (Pipe-cross reactor setup) | 23.5% | 9.3 | 10.8 | 311 | 62 | 0.20% | 1.89% |
| 30% Al$_2$O$_3$ feed (Pre-neutralizer setup) | 21.0% | 8.8 | 10.1 | 317 | 63 | 0.17% | 1.87% |
| 40% Al$_2$O$_3$ Feed (Pre-neutralizer setup) | 28.7% | 8.8 | 10.1 | 315 | 63 | 0.15% | 1.38% |
| 50% Al$_2$O$_3$ feed (Pre-Neutralizer setup | 37.3% | 9.0 | 12.1 | 311 | 63 | 0.18% | 1.23% |
| 5% Al$_2$O$_3$ Feed into pre-neutralizer | 6.5% | 10.6 | 13.4 | 326 | 62 | 0.44% | 2.66% |
| 10% Al$_2$O$_3$ Feed into Pre-Neutralizer | 6.4% | 11.9 | 14.6 | 307 | 63 | 0.12% | 1.69% |
| Comparison | | | | | | | |
| Non-Coherent (18.5% Al$_2$O$_3$, 10.2% Solid Binder, 71.2% Crushed MAP) | 12.2% | 4.4 | | 295 | 48 | 0.40% | |

Figure 6:
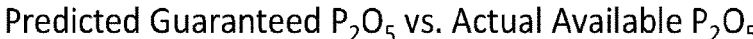
FIG. 6 is a plot comparing predicted versus actual available $P_2O_5$ in coherent dispersible granules, according to an embodiment of the present disclosure.
Figure 6:
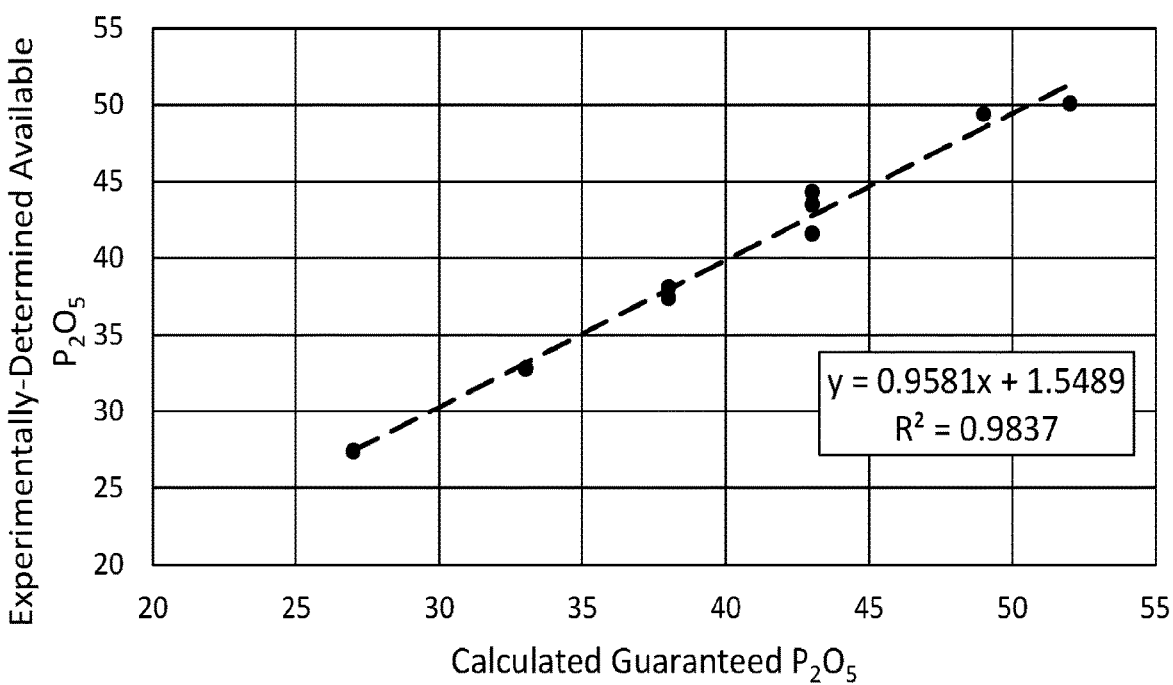

Referring to FIG. 6, a plot compares the calculated P$_2$O$_5$ content of coherent dispersible granules 1 based on projected material inputs into the phosphoric acid ammoniation-granulation process and the experimentally-determined P$_2$O$_5$ content. The slope of the linear regression model does not statistically differ from m=1, indicating that the experimentally-determined available P$_2$O$_5$ content matched the projected P$_2$O$_5$ content.

Figure 7:
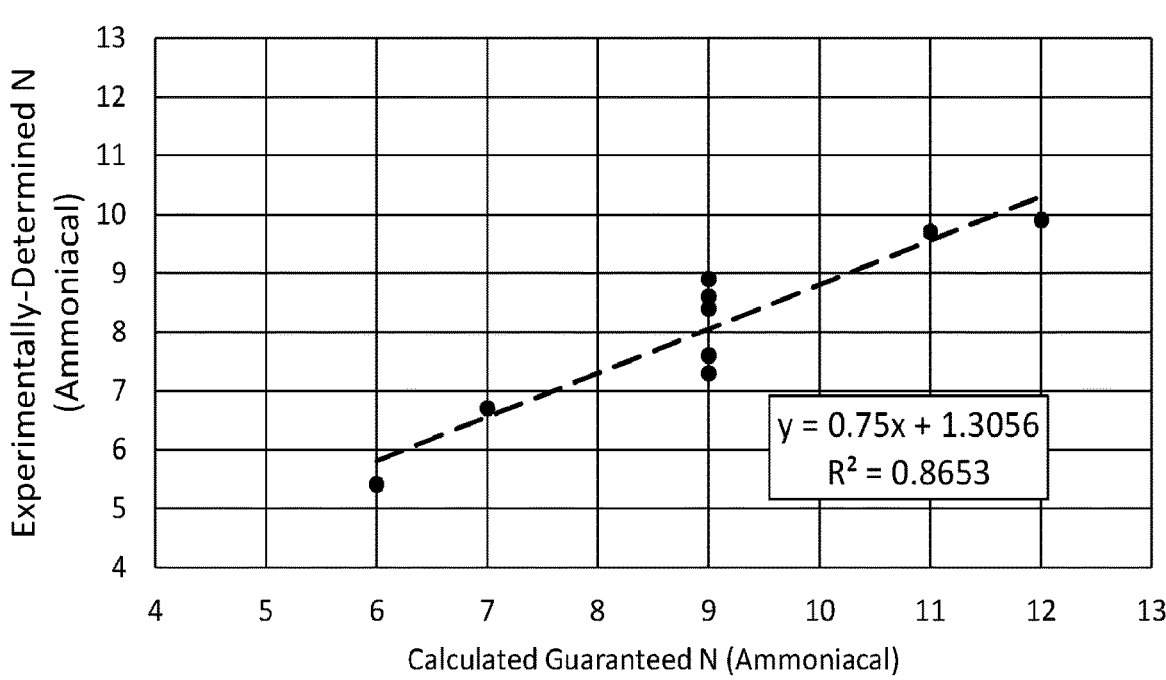
FIG. 7 is a plot comparing total nitrogen content of coherent dispersible granules (predicted versus actual), according to an embodiment of the present disclosure.

Referring to FIG. 7, a plot compares the calculated total nitrogen content based on projected material inputs into the phosphoric acid ammoniation-granulation process and the experimentally-determined total nitrogen content. The slope of the linear regression model is statistically lower than m=1, indicating that the production process required a reduction in ammonia input following addition of metal oxide into the process.

Figure 8:
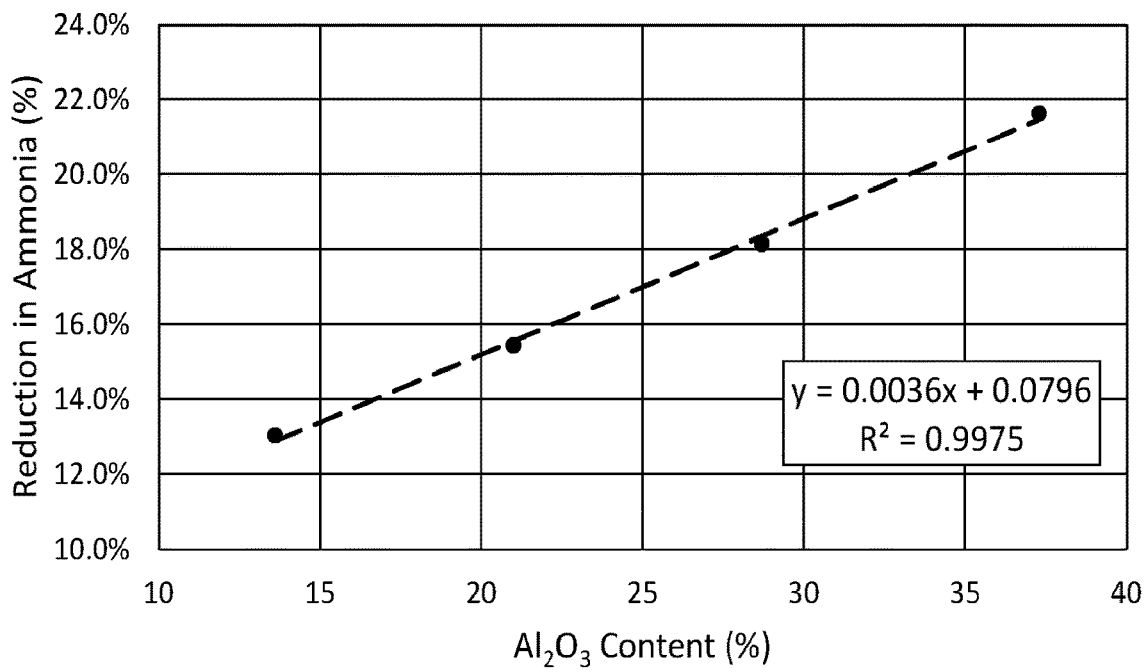
FIG. 8 is a plot correlating alumina content with ammonia usage in coherent dispersible granule production, according to an embodiment of the present disclosure.

Referring to FIG. 8, a plot correlates the reduction in ammonia supplied into the phosphoric acid ammoniation-granulation process relative to the projected ammonia input values versus the experimentally-determined aluminum oxide content within the produced granules. As aluminum oxide content increased, a greater reduction in ammonia requirements was observed while still achieving quality granulation.

Figure 9:
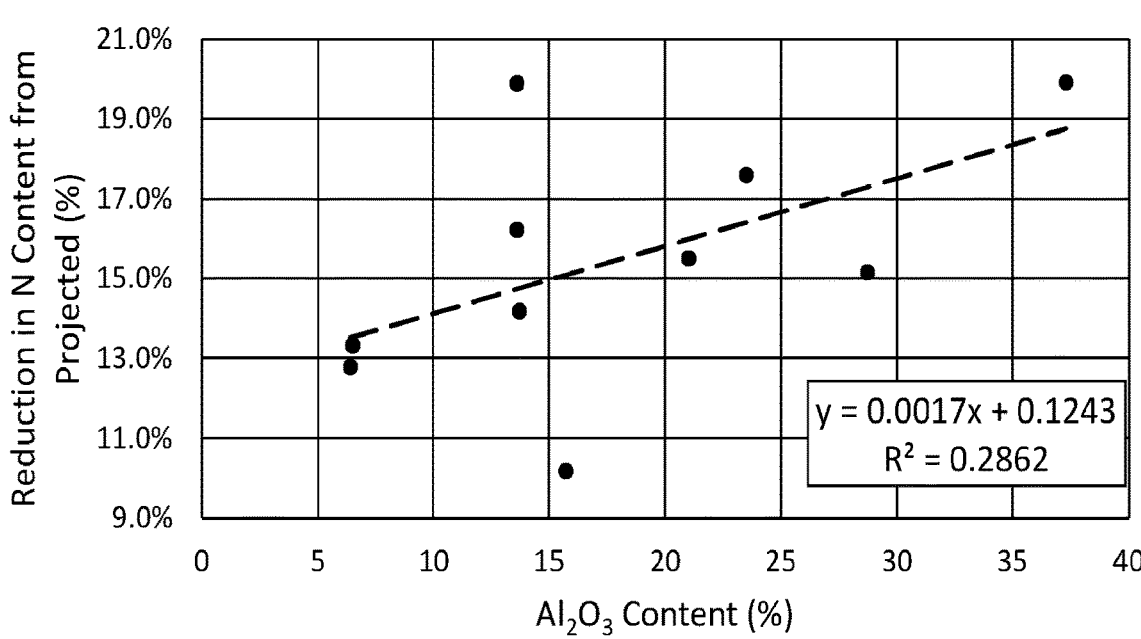
FIG. 9 is a plot correlating alumina content with nitrogen content reduction in coherent dispersible granules, according to an embodiment of the present disclosure.

Referring to FIG. 9, a plot demonstrates the reduction in granule nitrogen content compared to the projected granule nitrogen content versus the experimentally-determined aluminum oxide content within the produced granules. As aluminum oxide content increased, a greater reduction in ammonia requirements 3 we observed while still achieving quality granulation. When compared to FIG. 8, this demonstrates that the reduction in ammonia input during manufacturing resulted in a reduction in total nitrogen content within the granules.

Figure 10:
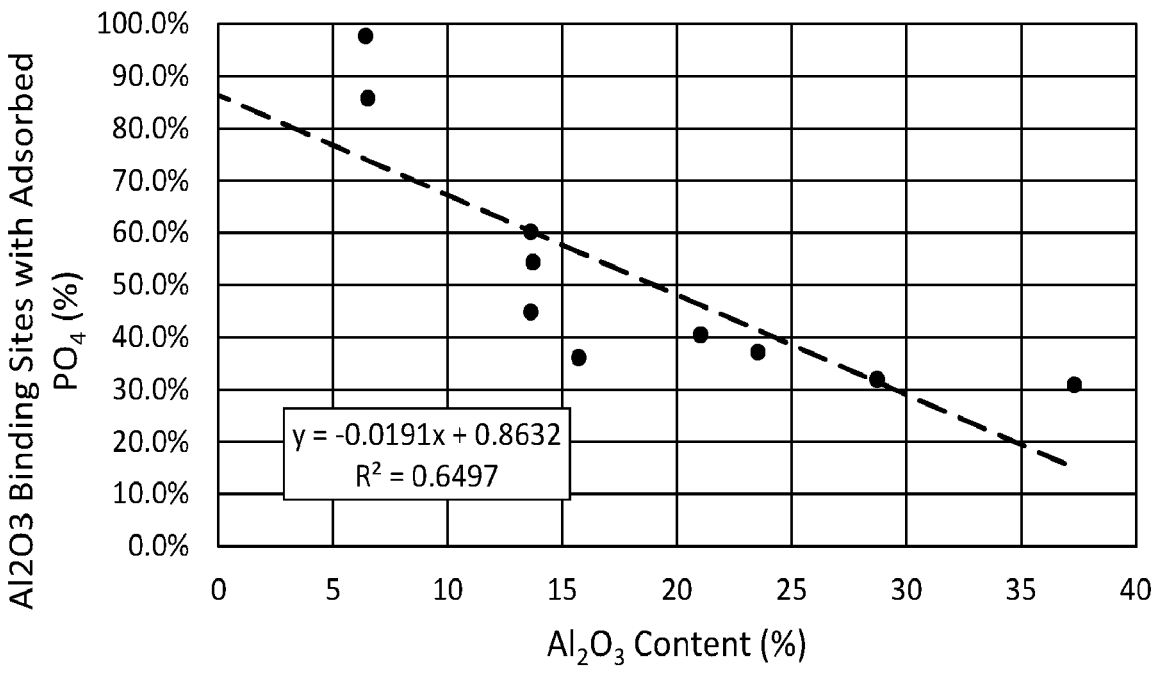
FIG. 10 is a plot correlating alumina binding sites with adsorbed phosphate in coherent dispersible granules, according to an embodiment of the present disclosure.

Referring to FIG. 10, the percentage of potential Al$_2$O$_3$ binding sites that were utilized by orthophosphate during the phosphoric acid ammoniation-granulation process versus the $Al_2O_3$ content within the produced granules is shown. The reduction in ammonia is directly proportional to the amount of $Al_2O_3$ adsorption sites that were utilized by free orthophosphate during the production process. As $Al_2O_3$ content increased, the adsorption efficiency of the $Al_2O_3$ decreases.

Figure 11:
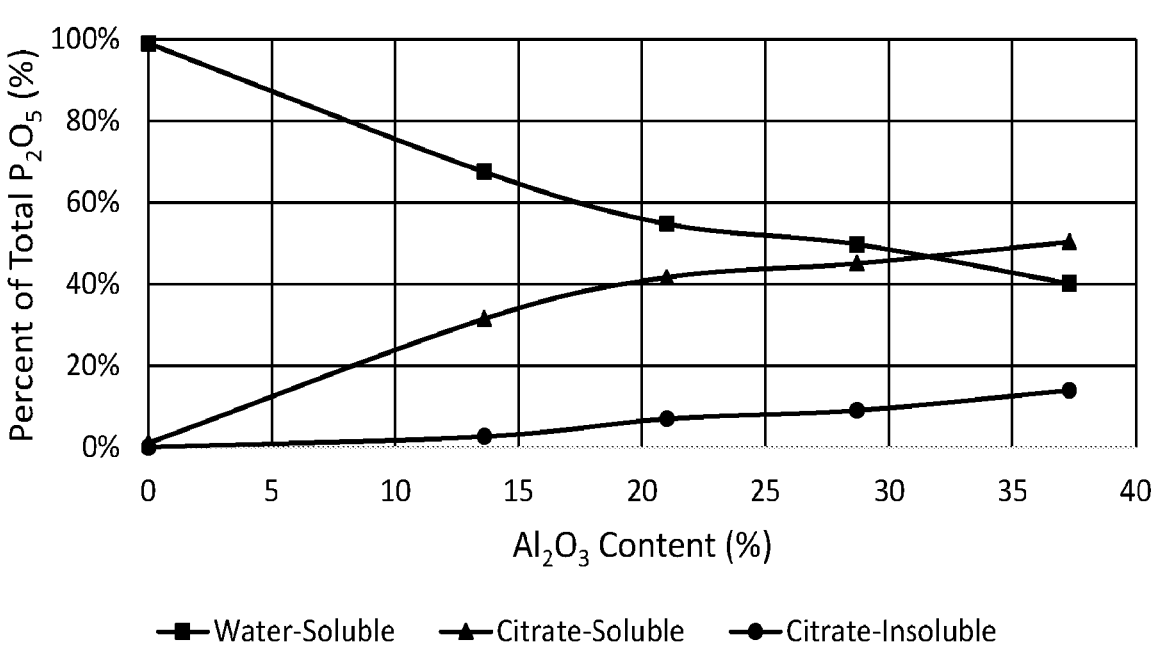
FIG. 11 is a plot correlating $P_2O_5$ water solubility with alumina content in coherent dispersible granules, according to an embodiment of the present disclosure.

Referring to FIG. 11, the percent of total $P_2O_5$ that was water-soluble, citrate-soluble, or citrate-insoluble is compared to the finished granule $Al_2O_3$ content. As $Al_2O_3$ content increased, the water-soluble $P_2O_5$ decreased, while the citrate-soluble and citrate-insoluble $P_2O_5$ fractions increased. This indicates that a substantial portion of the orthophosphate was indeed adsorbed onto the $Al_2O_3$ particle during the granulation process.

Referring to FIG. 12, the percentage of on-size granules produced during the manufacturing process is compared to the aluminum oxide content in the granules. Granulation efficiency decreased as aluminum oxide content increased. Based on the trend, in one embodiment, a 60% aluminum oxide content by weight may be the largest theoretical inclusion rate that would be conducive for feasible production volume.

Referring to FIG. 13, in one iteration of the manufacturing tests, aluminum oxide was fed directly into the pre-neutralizer reactor vessel 20. A slurry from that vessel was then fed into the granulator 30. The slurry was maintained at a viscosity lower than about 2000 cP in order to be fed adequately into the granulator 30. The aluminum oxide feed rate into the pre-neutralizer was measured as a percentage of selected material inputs (aluminum oxide, ammonia (gas), and phosphoric acid (liquid)) at all stages in the process (i.e., 10% $Al_2O_3$ content in finished granule) versus the slurry viscosity. In the apparatus tested, more than 10% $Al_2O_3$ content in the granule was not practical be fed into the pre-neutralizer without adversely affecting manufacturing conditions.

While the foregoing specification illustrates and describes exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. Coherent dispersible granules, comprising:
at least one metal oxide domain; and
at least one phosphate domain,
wherein the at least one metal oxide domain and the at least one phosphate domain are present in the coherent dispersible granules as distinct domains coherently agglomerated together and the coherent dispersible granules have a coherent dispersible granule crush strength of at least 5 lbf, and
wherein the at least one phosphate domain includes a phosphate selected from the group consisting of:
superphosphate, present at a metal oxide:phosphate ratio of from 4:1 to 1:4;
nitrophosphate;
ammonium phosphate; and
combinations thereof.

2. The coherent dispersible granules of claim 1, further including at least one additional domain present as a distinct domain, wherein the at least one additional domain is selected from the group consisting of:
at least one nutrient domain including at least one additive selected from the group consisting of bioavailable species of molybdenum, selenium, zinc, copper, cobalt, iron, nickel, manganese, vanadium, calcium, potassium, sulfur, chlorine, silicon, magnesium, sodium, nitrogen, boron, and combinations thereof;
at least one pesticide domain;
at least one biological additive domain including at least one additive selected from the group consisting of humics, fulvics, living microbes, microbial metabolites, plant extracts, exogenous plant hormones, and combinations thereof; and
combinations thereof.

3. The coherent dispersible granules of claim 2, wherein the at least one additional domain is coherently agglomerated with the at least one metal oxide domain and the at least one phosphate domain in the coherent dispersible granules.

4. The coherent dispersible granules of claim 2, wherein the at least one additional domain is agglomerated with the coherently agglomerated at least one metal oxide domain and at least one phosphate domain.

5. The coherent dispersible granules of claim 2, wherein the at least one additional domain is coated onto the coherently agglomerated at least one metal oxide domain and at least one phosphate domain.

6. The coherent dispersible granules of claim 1, wherein the coherent dispersible granules have an intergranular variability in metal oxide:phosphate weight ratio of ±40%.

7. The coherent dispersible granules of claim 1, wherein the at least one metal oxide domain includes an activated metal oxide domain.

8. The coherent dispersible granules of claim 1, wherein the at least one metal oxide domain and the at least one phosphate domain are intragranularly homogenously distributed in the coherent dispersible granules.

9. The coherent dispersible granules of claim 1, wherein the at least one metal oxide domain and the at least one phosphate domain are intergranularly homogenously distributed in the coherent dispersible granules.

10. The coherent dispersible granules of claim 1, wherein the at least one metal oxide domain is at least 80% surrounded by the at least one phosphate domain.

11. The coherent dispersible granules of claim 1, wherein the metal oxide:phosphate weight ratio ranges from 4:1 to 1:4.

12. The coherent dispersible granules of claim 1, further including at least one of a water-soluble binder, a suspension agent, or an emulsifying agent.

13. Coherent dispersible granules, comprising:
at least one metal oxide domain including metal oxide selected from the group consisting of aluminum oxide, α-alumina, β-alumina, γ-alumina, ε-alumina, bauxite, bauxite residue, alum sludge, alumina trihydrate, alumina monohydrate, boehmite, pseudoboehmite, gibbsite, iron oxide, hematite, maghemite, magnetite, goethite, iron hydroxide, calcium oxide, calcium hydroxide, copper oxide, magnesium oxide, manganese oxide, manganese dioxide, nickel oxide, silicon dioxide, and combinations thereof; and
at least one phosphate domain,
wherein the at least one metal oxide domain and the at least one phosphate domain are present in the coherent dispersible granules as distinct domains coherently agglomerated together and the coherent dispersible granules have a coherent dispersible granule crush strength of at least 5 lbf, and wherein the at least one phosphate domain includes a phosphate selected from the group consisting of:

superphosphate, present at a metal oxide:phosphate ratio of from 4:1 to 1:4;

nitrophosphate;

ammonium phosphate; and combinations thereof.

14. A method for forming coherent dispersible granules, comprising:

forming a phosphate in a reactor vessel;

introducing metal oxide particles into the presence of the phosphate while the phosphate is being formed;

co-agglomerating the phosphate and the metal oxide particles in a rotary drum granulator to form coherent dispersible granules; and drying the coherent dispersible granules, wherein the coherent dispersible granules include at least one metal oxide domain and at least one phosphate domain which are present in the coherent dispersible granules as distinct domains and the coherent dispersible granules have a coherent dispersible granule crush strength of at least 5 lbf.

15. The method of claim 14, wherein forming the phosphate includes melting at least one acidic phosphate from a solid form to a liquid form.

16. The method of claim 15, wherein the at least one acidic phosphate is selected from the group consisting of monoammonium phosphates, diammonium phosphates, and combinations thereof.

17. The method of claim 15, wherein melting the at least one acidic phosphate and co-agglomerating the at least one acidic phosphate and the metal oxide particles includes a steam granulation process.

18. The method of claim 14, wherein forming the phosphate includes:

disposing phosphoric acid and, optionally, sulfuric acid in an acid surge tank; and reacting the phosphoric acid and, optionally, the sulfuric acid with ammonia in the reactor vessel to form ammonium phosphate as the phosphate.

19. The method of claim 14, wherein introducing the metal oxide particles into the presence of the phosphate includes at least one of:

premixing the metal oxide particles with phosphoric acid prior to reacting the phosphoric acid with the ammonia;

adding the metal oxide particles into at least one of an acid surge tank, an acid control tank upstream of the reactor vessel, a phosphate rock weigher feeder upstream o the reactor vessel, the reactor vessel, the rotary drum granulator, or a rotary dryer;

feeding the metal oxide particles through a pipe cross reactor as the reactor vessel;

premixing the metal oxide particles with at least one of phosphoric acid, sulfuric acid, or nitric acid prior to mixing the at least one of phosphoric acid, the sulfuric acid, or the nitric acid with ground phosphate rock.

20. The method of claim 14, wherein drying the coherent dispersible granules includes drying the coherent dispersible granules in a rotary dryer.

21. The method of claim 14, wherein forming the phosphate includes:

mixing ground phosphate rock and at least one of phosphoric acid, sulfuric acid, or nitric acid in a reactor; and reacting the ground phosphate rock with the at least one of the phosphoric acid, the sulfuric acid, or the nitric acid in the reactor to form at least one of a superphosphate slurry or a nitrophosphate slurry as the phosphate.

* * * * *